March 31, 1959 W. W. GOLDSWORTHY ET AL 2,880,318
PEAK LIMITING AMPLIFIER
Filed Nov. 25, 1955
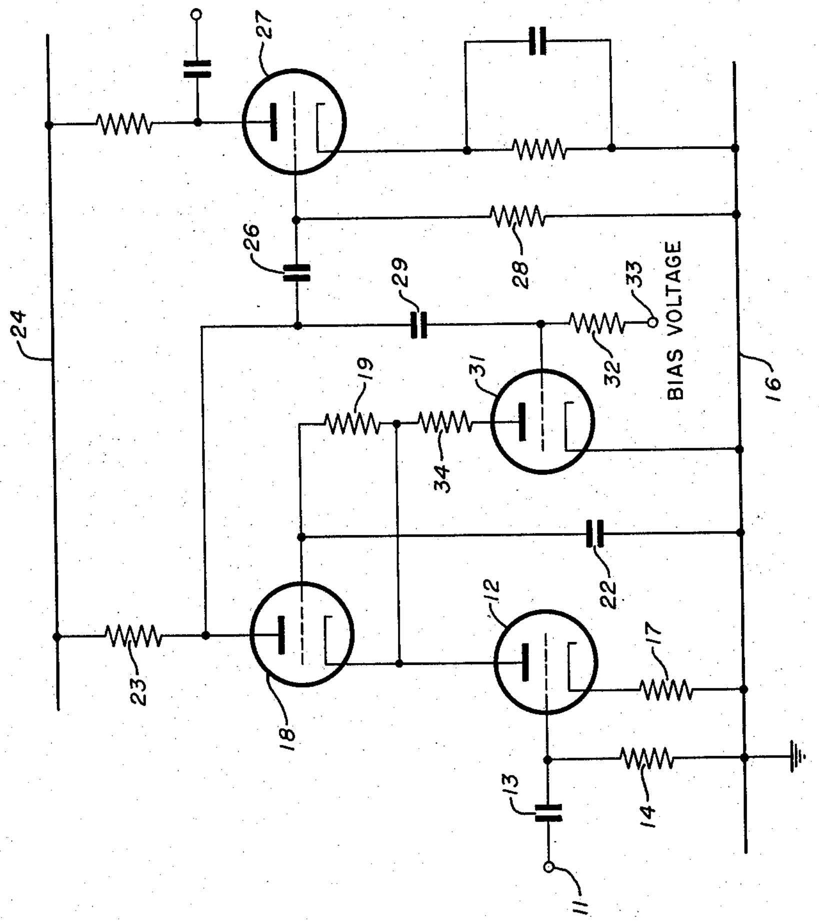
INVENTORS.
WILLIAM W. GOLDSWORTHY
BY JAMES B. ROBISON
Roland A. Anderson
ATTORNEY.

United States Patent Office 2,880,318

Patented Mar. 31, 1959

2,880,318

PEAK LIMITING AMPLIFIER

William W. Goldsworthy, Orinda, and James B. Robison, Richmond, Calif., assignors to the United States of America as represented by the United States Atomic Energy Commission Application November 25, 1955, Serial No. 549,208

5 Claims. (Cl. 250—27)

The present invention relates to electronic circuitry and, more particularly, to a peak voltage amplitude limiting system adapted for use with a cascode type of amplifier. The invention has general utility as a peak limiter and is particularly adaptable for use with pulse counters where it is necessary to limit voltage peaks to prevent control grid current flow.

In pulse counters, with circuit parameters selected to obtain the amplification necessary for weak pulses, high amplitude pulses cause amplifying tubes to draw control grid current. Such current builds up a biasing charge on the coupling capacitors, an especially deleterious effect in pulse counting equipment since it results in blocked or dead time in the circuit after cessation of a high amplitude pulse. Thus pulses applied to the amplifier during the blocked or dead time are lost or suppressed in amplitude, resulting in inaccurate counting.

It is necessary then to include peak limiting circuits in such amplifiers, limiting input signals safely below the level at which there is control grid current flow. Conventional limiting circuits have been found unsatisfactory for the particular application described. The diode type of limiter has the disadvantage of requiring a low internal impedance bias voltage source, necessitating special considerations in the power supply design. In diode limiters, it has been found that the level at which peak limiting occurs varies with changes in tube parameters such as are caused by aging. The present invention circumvents these and other difficulties.

While the invention is particularly valuable for use with counting circuits, there are obviously other situations where the device could be advantageously used. One such application is in radio and television receivers where the effects of high amplitude atmospheric disturbance may be mitigated by a voltage peak limiting device.

It is an object of the present invention to provide amplitude limiting for an input signal to an amplifier.

It is another object to provide means for elimination of control grid current in an amplifier.

It is still another object to provide a voltage limiter which is completely passive until input voltage levels reach a selected limit amplitude.

It is a further object of the invention to provide a pulse amplifier having no blocked period after the passage of a high amplitude pulse.

The invention will be best understood by reference to the accompanying drawing wherein there is shown a conventional cascode type amplifier circuit together with a preferred embodiment of the present invention.

Referring now to the drawing there is shown an input terminal 11 for conveniently connecting a transmission line from a source of pulses. The input terminal 11 is coupled to the control grid of a first triode cascode tube 12 through an input capacitor 13. An input grid resistor 14 couples the control grid of the first cascode tube 12 to a ground potential bus 16 while cathode bias is provided by a cascode cathode resistor 17 connected between the cathode and the ground potential bus 16.

The plate of the first cascode tube 12 is connected to the cathode of a second cascode tube 18, the second tube having a control grid coupled to the cathode through a cascode grid resistor 19, thus providing a direct voltage bias level for the control grid. A decoupling capacitor 22 is connected between the control grid of the second cascode tube 18 and the ground potential bus 16, holding control grid at essentially a constant voltage level. A cascode plate resistor 23 couples the plate of the second cascode tube 18 to a positive voltage bus 24 which is supplied with a direct current operating potential obtained from a standard power supply. A coupling capacitor 26 provides for application of voltage variations occurring at the plate of the second cascode tube 18 to the control grid of an amplifier tube 27. The circuitry generally used in conjunction with the amplifier tube 27 follows standard design.

The circuit as described up to this point is subject to blocked or dead periods. When relatively large negative pulses are applied to the input terminal 11, the positive output signal at the plate of the second cascode tube 18 may be high enough in amplitude to cause the flow of control grid current in the amplifier tube 27. The electrons collected by the control grid of the amplifier tube 27 result in a negative charge on the coupling capacitor 26. After the cessation of the input pulse, the charge on the coupling capacitor 26 gradually discharges through the amplifier grid resistor 28. During the period that the negative charge on the coupling capacitor 26 remains, the amplifier tube 27 may be biased to cut-off so that for a short time subsequent input signals are not passed by the amplifier tube 27. This is the condition which the present invention avoids.

Proceeding now to the limiter portion of the circuit, a peak limiter capacitor 29 couples from the plate of the second cascode tube 18 to the control grid of a peak limiter tube 31. A peak limiter grid resistor 32 couples the control grid of the peak limiter tube 31 to a negative bias terminal 33, provided for conveniently connecting to a supply of negative D.C. bias. The cathode of the peak limiter tube 31 is connected to the ground potential bus 16 and the plate is connected to the cathode of the second cascode tube 18 through a 1000 ohm oscillation suppression resistor 34.

To illustrate the operation of the device, assume that suitable operating potentials are applied to the circuit. A high amplitude negative pulse at the input terminal 11 then results in a high positive amplitude pulse at the plate of the second cascode tube 18. Such positive pulse is coupled to the control grid of the amplifier tube 27 and the control grid of the peak limiter tube 31. If the amplitude of the pulse is sufficient to overcome the bias voltage applied at the bias terminal 33, there will be passage of electron current through the limiter tube 31. Such electron current then passes through the suppression resistor 34 to the cathode of the second cascode tube 18, through the tube and the cascode plate resistor 23 to the bus 24.

When the peak limiter tube 31 starts conducting, the voltage at the cathode of second cascode tube 18 is lowered. Since the decoupling capacitor 22 holds the control grid of the second cascode tube 18 at a constant voltage, with the decrease in cathode voltage there is an increase in current flow through the second cascode tube 18 and through the first plate resistor 23. The increase in current through the first plate resistor 23 causes the voltage at the plate of the second cascode tube to become less positive and an equilibrium point is established above which the voltage at the plate of the second cascode tube and the control grid of the amplifier tube 27 will not go. Thus any input pulse which would ordinarily cause the control grid of the amplifier tube to draw current is limited. Therefore, there is essentially no control grid current in the amplifier tube 27 so that with cessation of a high amplitude input pulse, the circuit has full sensitivity to subsequent input signals. The circuit may be considered as having degenerative feedback which acts only on input pulses in a selected voltage range. The voltage level at which degenerative feedback occurs is adjusted by varying the value of bias voltage applied to the bias terminal 33. It is generally preferred that the peak limiter tube 31 have a sharp cut-off characteristic so that conduction commences at a well-defined input voltage level. The limiter has no effect on signals below the overload level.

The oscillation suppression resistor 34 minimizes any instability in the circuit due to the sharpness or abruptness of the degenerative feedback action.

As a variation, the control grid potential of the second cascode tube 18 may be maintained constant by a connection to a voltage divider.

While the present invention has been disclosed with reference to a single preferred embodiment, it will be apparent to those skilled in the art that numerous variations and modifications are possible within the spirit and scope of the invention and thus it is not intended to limit the invention except as defined in the following claims.

What is claimed is:

1. In a peak limiter for use with a cascode circuit, the combination comprising a first cascode tube having a cathode and an anode and a control electrode, an input terminal coupled to the control electrode of said first cascode tube, a second cascode tube having a control electrode and an anode and a cathode, the cathode of said second cascode tube being connected to the anode of said first cascode tube, a peak limiter tube having a cathode and a control electrode and an anode, the control electrode of said peak limiter tube being coupled to the anode of said second cascode tube, the anode of said peak limiter tube being connected to the cathode of said second cascode tube, a bias voltage source connected to the control electrode of said peak limiter tube, and an output terminal coupled to the anode of said second cascode tube.

2. In an electronic circuit, the combination comprising a first cascode tube having a control electrode and a cathode and an anode, an input terminal coupled to the control electrode of said first cascode tube, a second cascode tube having a control electrode and a cathode and an anode, the cathode of said second cascode tube being connected to the anode of said first cascode tube, a positive voltage source, an impedance coupled from the anode of said second cascode tube to said positive voltage source, a limiter tube having a cathode and a control electrode and an anode, the control electrode of said limiter tube being coupled to the anode of said second cascode tube, the anode of said limiter tube being coupled to the cathode of said second cascode tube, a source of cut-off bias coupled to the control electrode of said limiter tube, and an output terminal coupled to the anode of said second cascode tube.

3. In an amplitude limiting system, the combination comprising a first cascode tube having an anode and control electrode and cathode, said control electrode being adapted to receive input signals, a second cascode tube having an anode and cathode and control electrode, said cathode being connected to the anode of said first cascode tube, a source of operating potential, an anode resistor connected from the anode of said second cascode tube to said source of operating potential, a limiter tube having an anode and a cathode and a control electrode, said control electrode being coupled to the anode of said second cascode tube, a negative bias source coupled to the control electrode of said limiter tube, a suppression resistor connected from the anode of said limiter tube to the anode of said first cascode tube, control means holding the control electrode potential of said second cascode tube at a constant value, an output terminal, and a coupling capacitor connected from the anode of said second cascode tube to said output terminal.

4. In an amplitude limiter circuit, the combination comprising a power supply having a positive voltage terminal and a negative voltage terminal, a first cascode tube including an anode and having a cathode coupled to said negative voltage terminal and a control grid adapted to receive input signals, a second cascode tube including a control grid and having an anode coupled to said positive voltage terminal and a cathode coupled to the anode of said first cascode tube, a filter means coupled from the control grid of said second cascode tube to said negative voltage terminal and limiting high frequency voltage variations on such grid, and a limiter circuit connected in parallel with said first cascode tube and having an input terminal coupled to the anode of said second cascode tube, said limiter circuit having a low time constant and being of the class having an internal impedance dependent on potentials applied at the said input thereto.

5. In a voltage amplitude limiting device, the combination comprising a power supply having a positive voltage terminal and a negative voltage terminal, an input terminal, a first cascode tube having an anode and having a cathode coupled to said negative voltage terminal, means coupling said input terminal to a control electrode of said first cascode tube, a second cascode tube including a control electrode and having an anode coupled to said positive voltage terminal and a cathode coupled to the anode of said first cascode tube, a filter capacitor coupled from the control electrode of said second cascode tube to said negative voltage terminal for eliminating high frequency voltage variations on such control electrode, a limiter tube having a cathode coupled to said negative voltage terminal and an anode coupled to the cathode of said second cascode tube, means coupling a control electrode of said limiter tube to the anode of said second cascode tube, a source of cut-off bias voltage coupled to the control electrode of said limiter tube whereby said limiter tube conducts only when a signal potential appears at the control electrode of said limiter tube negating said cut-off bias.

References Cited in the file of this patent

UNITED STATES PATENTS

| | | |
|---|---|---|
| 2,284,102 | Rosencrans | May 26, 1942 |
| 2,305,842 | Case | Dec. 22, 1942 |
| 2,369,066 | Maxwell | Feb. 6, 1945 |
| 2,428,039 | Royden | Sept. 30, 1947 |
| 2,544,340 | Maxwell | Mar. 6, 1951 |
| 2,552,136 | Beurtheret | May 8, 1951 |
| 2,802,070 | Fishbine et al. | Aug. 6, 1957 |
| 2,810,025 | Clements | Oct. 15, 1957 |